United States Patent
Aspden

[15] 3,662,499
[45] May 16, 1972

[54] ADJUSTABLE LAP
[72] Inventor: Ronald Aspden, Bedford, Mass.
[73] Assignee: Itek Corporation, Lexington, Mass.
[22] Filed: Dec. 18, 1969
[21] Appl. No.: 886,235

[52] U.S. Cl. ............................................. 51/204, 51/209 R
[51] Int. Cl. ......................................................... B24d 3/00
[58] Field of Search ............... 51/204, 209 R, 209 DL, 209 S

[56] References Cited

UNITED STATES PATENTS

| 766,079 | 7/1904 | Warner | 51/209 R |
| 1,035,758 | 8/1912 | Undeen | 51/209 R |
| 1,440,820 | 1/1923 | De Wille | 51/209 DL |
| 2,442,129 | 5/1948 | Hollstrom | 51/209 R |
| 3,121,982 | 2/1964 | Miller | 51/209 R |
| 3,464,166 | 9/1969 | Bouvier | 51/209 R |

*Primary Examiner*—Lester M. Swingle
*Attorney*—Homer O. Blair, Robert L. Nathans and Gerald H. Glanzman

[57] ABSTRACT

An adjustable lap for the fine grinding of optical and other surfaces. A plate with a plurality of holes therein supports a like plurality of rods positioned within said holes. Each rod has a grinding pellet mounted on one end thereof, which end extends a predetermined distance outwardly of the holes. An adhesive is provided to mount the rods to the plate such that the extended portion of each rod will be maintained at the predetermined distance to permit accurate grinding of the surface.

18 Claims, 2 Drawing Figures

(PRIOR ART)

PATENTED MAY 16 1972 3,662,499

RONALD ASPDEN
INVENTOR.

BY Gerald H. Glanzman

ATTORNEY

ADJUSTABLE LAP

BACKGROUND OF THE INVENTION

1. Field of the Invention

This invention relates to an adjustable lap for the fine grinding of optical and other surfaces.

2. Description of the Prior Art

Lapping is a process employed in various fields to produce accurately shaped, highly finished surfaces. The process has found particularly widespread use in the optical field for the fine grinding of lenses and other optical elements, and many types of laps have been designed for various purposes. In FIG. 1 of the drawings a pellet lap is shown which is in general use in the optical field and available in the prior art. This lap consists of a support plate 10 having a plurality of grinding pellets 11 mounted adjacent a face thereof by means of a thermoplastic adhesive 12. By placing this lap adjacent a surface to be refined and by moving the lap relative to the surface according to a predetermined plan, accurate figuring of the surface can be accomplished. This lap, however, is not wholly satisfactory for several reasons, which reasons can be more easily understood by first discussing the manner in which such a lap is constructed.

Initially, it is necessary that the pellets be accurately positioned on the plate. As will be explained more fully hereinafter, this is a time consuming process requiring highly skilled technicians and often expensive equipment as well. Upon completion of this step, a layer of thermoplastic cement is applied to a face of the plate and the pellets are partially embedded in the cement in the determined positions. The plate with the pellets mounted thereon is then placed against a previously prepared master surface, and the cement is heated to cause it to soften. A force is then applied to the top of the plate causing the pellets to be pressed against the master surface and to conform to the shape of the master surface. The cement is then allowed to cool and harden to lock the pellets in position, and a finished lap is provided which may be mounted on some well-known machine designed for the purpose or otherwise used to grind an optical surface. During this construction process, a problem that often arises is that of preventing the pellets from coming into contact with the plate.

In the lap shown in FIG. 1, the pellets are supported directly adjacent the plate, and are separated therefrom only by the cement, and, as a result, movement of the pellets in an axial direction upon being pressed against the master surface is limited by the plate. Depending on the shape of the master surface, it would be quite possible for one or more of the pellets to be pushed into contact with the plate thus preventing the pellet array from correctly conforming to the shape of the master surface and resulting in an inaccurate lap. To prevent this from happening, the present practice is to apply a relatively thick layer of cement between the pellets and the plate thus increasing the freedom of axial movement of the pellets and reducing the danger of this "wedge effect" from occurring. Clearly, a more suitable solution to the problem would be desirable.

Another construction problem results from the need to apply heat to the lap in order to soften the thermoplastic cement. The resulting temperature variations have a tendency to cause the support plate to warp and deform, which deformation can be transmitted directly to the pellets causing them to be moved out of proper alignment. Careful control over the construction process is necessary to minimize this problem.

Yet another problem becomes apparent when the pellets must be replaced. Use of the lap results in a gradual erosion of the pellet material until eventually replacement of the pellets becomes necessary. The replacement process is essentially the same as the initial positioning process and must be repeated every time the pellets wear out. This means that skilled personnel have to periodically leave their other work and return to reposition the new pellets. This is clearly an undesirable and expensive waste of time.

In accordance with the present invention, therefore, it is desirable to provide a lap in which these above-mentioned problems are overcome. In particular, it is desirable that a lap be constructed such that when it is necessary to replace the pellets due to wear, the replacement can be made rapidly and easily by relatively unskilled personnel. Furthermore, it is desirable to provide a lap in which some warping of the support plate can be tolerated without affecting the position of the pellets. Finally, it is desirable that a lap be provided in which there is no danger of the grinding pellets being pushed up into contact with the support plate during fabrication of the lap.

SUMMARY OF THE INVENTION

In accordance with one embodiment of this invention, the above and other desired goals are attained by providing a lap in which the grinding pellets are mounted on the ends of a plurality of short rods, rather than directly on the support plate itself. The plate is provided with a plurality of holes drilled through its thickness, and the rods are positioned and supported within these holes. The holes are of slightly larger diameter than the rods, so that the rods will be positioned in the holes with a positive clearance fit, i.e., they will be capable of a small amount of lateral movement within the holes. The rods are slightly longer than the holes, such that a portion of each will extend outwardly beyond the plate, and the pellets are mounted on the ends of these extended portions of the rods. The rods themselves are mounted to the plate by means of thermoplastic cement applied between the rods and the surface of the plate.

In construction, the plate is first supported above a master surface by several removable support legs. The cement is then heated until softened and a force is applied to the top of each of the rods pressing them against the master surface and causing the pellets to conform to the shape of the master surface. The cement is then allowed to harden with the rods in this position, the support legs are removed, and the finished lap is provided.

Many distinct advantages accrue from a lap designed in this way. Initially, the replacement of worn-out pellets becomes a simple process that can be performed by persons of minimum skill in a short period of time. Once the holes have been drilled in the plate in the desired array, their positions become permanent, and when the pellets wear-out, it is only necessary to remove the old rods and insert new ones. There will no longer by any need to measure the pellet positions every time they have to be replaced. After insertion of the new rods, it is only necessary to place the lap adjacent the master surface and reset the pellets as above to conform to the surface shape. Additionally, since the rods are freely movable in the holes during the construction of the lap, there is no danger that they or the pellets will be wedged up against the plate to ruin the accuracy of the lap. Furthermore, since the diameter of the rods is slightly less than that of the holes, a small amount of warping of the plate will not be transmitted to the rods. Also, the holes will prevent excessive lateral shifting of the pellets during construction. Finally, the rods, with the pellets attached, may be easily and rapidly transferred to plates having different hole arrays for use on different surfaces.

In general, the lap according to this invention can be made and renewed much easier and faster than those in the prior art while maintaining the extreme accuracy needed in the optical field.

The above and other features of the invention will be more readily understood with reference to the following detailed description of a preferred embodiment taken in conjunction with the accompanying drawings.

DESCRIPTION OF THE PREFERRED EMBODIMENT

Figure 1:
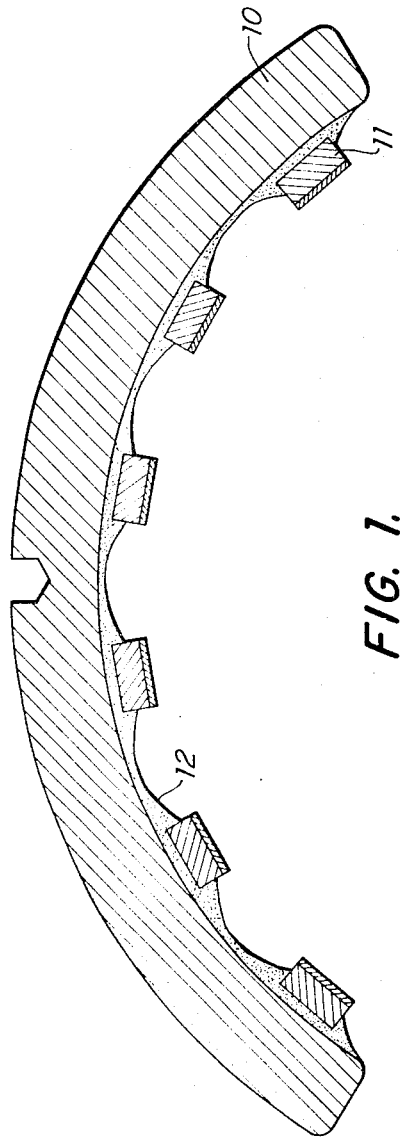
FIG. 1 shows, in cross-section, a pellet lap of the type presently available in the prior art.
Figure 2:
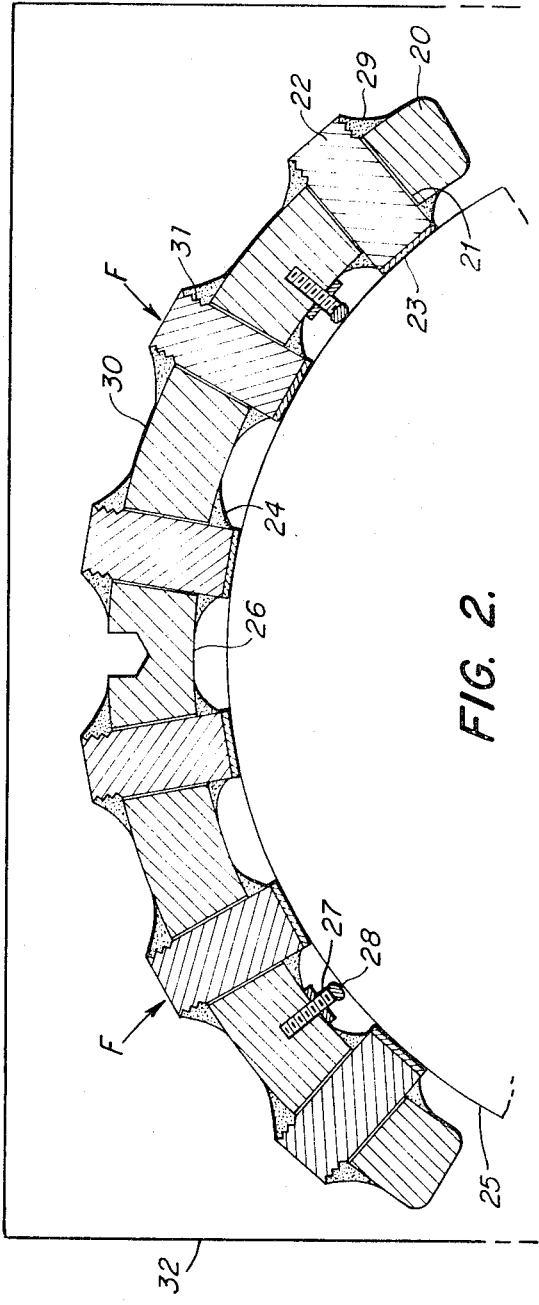
FIG. 2 is a cross-sectional view of a lap constructed according to the present invention.

FIG. 2 illustrates a pellet lap according to the present invention to provide for the fine grinding of optical and other surfaces. A support member 20 is provided in the form of a relatively thin, curved plate. Drilled through the plate in a predetermined array are a plurality of holes 21 of generally circular cross-section. The positioning of these holes is important in order to maximize the useful life of the lap by compensating for the wear pattern of the pellets. There are several techniques for determining the optimum positions for the pellets including computer modeling and experimental trial and error. In any event, it is a time consuming process and generally requires the services of highly skilled persons. These are the same methods employed in positioning the pellets in the prior art laps, and further description, therefore, is not deemed to be necessary here.

Positioned within each of the holes are a plurality of rod-shaped elements 22. These rods are somewhat longer than the holes and are shown as protruding out both faces of the plate, although this is not essential; it being essential only that they extend outwardly beyond one face. The diameter of the rod is somewhat smaller than that of the holes such that the rods will be mounted in the holes with a positive clearance fit to permit a slight amount of radial movement of the rods within the holes. Permantly mounted on one end of each rod, as by solder are the grinding pellets 23. These pellets generally consist of a metallic base having, for example, a layer of fine diamond facets bonded thereon. These pellets are available on the open market in several sizes and need not be made specially for the lap.

To mount the rods to the plate, an adhesive 24 is provided applied along the bottom surface 26 of the plate. This adhesive is of a type which has a relatively low softening temperature and may be any one of many synthetic thermoplastic resins or other adhesives presently known and used in the art. Shellac has proven to be an effective material to use in most cases.

In constructing the lap, the plate with the rods extending through the holes is supported above a master surface 25 by means of a plurality of support legs 27 (generally three in number) which may be screw threaded or otherwise mounted to the plate for easy removal upon completion of the construction process. If desired, the support legs may be provided with base pads 28 of Teflon or another material to prevent scratching of the master surface. The master surface is a previously prepared surface conforming to the shape of the surface that it is desired to produce. Heat is applied to the cement to cause it to soften, and a predetermined force is then applied against the upper ends of the rods causing the rods and pellets attached thereto to move downwardly into contact with the master surface to conform to the shape thereof. While the force is still being applied, the cement is permitted to cool and harden to lock the rods in their final position wherein a portion of each rod will extend outwardly beyond the lower face 26 of the plate for a distance determined by the shape of the master surface. The support legs may then be removed and the lap can be attached to one of many machines presently used in the art to refine optical surfaces. The construction of the lap may conveniently be carried out in a small oven (illustrated schematically by chamber 32 in FIG. 2) to provide the proper temperature which will generally be in the neighborhood of 100°–150° F depending on the particular adhesive used. The force can be applied by a weighted plate having a soft rubber face or even by a loosely filled sandbag, the only requirement being that the weight be applied only against the upper ends of the rods and not against the plate. Less than 10 lbs. of force would be sufficient in most cases, depending, of course, on the size of the lap. For ease in illustration, the force applying means is represented by the two arrows F in FIG. 2, it being understood that the force will actually be applied against each of the rods shown in the drawing.

If desired, additional cement 29 may be applied between the upper face 30 of the plate and the rods to provide additional bonding strength. Also, portions of the rods may be threaded as shown at 31 to further increase the bond between the plate and the rods. Since the rods fit somewhat loosely in the holes, they are capable of slight lateral movement in order to properly seat the pellets onto the master surface while being forced down onto the surface and still be locked into position when the cement is hardened.

From the above discussion, it is clear that the lap provided by this invention overcomes the problems associated with those in the prior art. When the pellets become worn after use, it is only necessary to reheat the adhesive, remove the rods, and insert new ones in the holes. Proper alignment of the pellets is provided automatically by the positions of the holes, and persons of minimum skill can carry out the procedure in a very short time. All they would be required to do after replacing the rods is to reposition the lap adjacent the master surface, reheat the adhesive, press the rods against the surface, and allow the adhesive to cool and reset. Since the rods are freely movable axially within the holes during fabrication, there is no danger of their being wedged up against the plate as in the prior art. The precise shape of the support plate is not critical as in the prior art since a small amount of warping or deformation will not be transmitted to the rods due to the loose fit of the rods in the holes. Finally, since lateral movement of the rods, and therefore, of the pellets, is limited by the size of the holes, there is no chance that the pellets will move out of position to such an extent that uneven pellet wear or inaccurate figuring will result. This is a real possibility in the prior art where the pellets are held only by the adhesive, and they can easily slide laterally along the adhesive while it is in a soft condition.

The present invention offers a high degree of flexibility for grinding or polishing all types of optical elements or other surfaces to a high degree of precision. An inventory of plates of various sizes and with different hole arrays can be maintained and the rods with the pellets attached thereto can be easily interchanged among them for use on different surfaces. Holes of different sizes may be provided in the same plate in some applications with rods of different diameters being provided for the different sized holes.

The plate and rods may be constructed of cast iron or any other suitable metal or non-metal. The plate may be concave in cross-section as shown in the drawings or of a different configuration, for example, convex or flat depending on the surface to be treated. The surfaces of the plate may be circular, rectangular or of any other shape, again depending on the surface to be treated.

The pellets may be any of several types well-known in the art. In addition to diamond pellets, abrasive pellets of ground glass or metal may also be employed. Non-abrasive ceramic material may also be used if a loose abrasive grinding process is desired. In such a process, a layer of loose abrasive material such as emery or aluminum oxide is put on the surface being treated, and a ceramic tile is attached to the ends of the rods to move the abrasive material over the surface. Also, if desired, the abrasive material might be bonded directly to the rods, or the rods themselves may be used as the grinding elements.

The size of the lap is quite variable depending on the surface to be ground. Plate diameters of from 2 inches to 2 feet are known. Dimensions of a typical lap, however, could be a 4-inch diameter plate having a thickness of one-fourth inch, pellets of one-half and/or one-fourth inch diameter, and holes of such size as to provide about one thirty-second of an inch clearance between the rods and the plate. The rods should generally be relatively thick compared to the thickness of the plate and need extend beyond the plate only far enough to permit them to accurately conform to the shape of the surface without the plate itself ever contacting the surface.

While there has been described and illustrated a preferred embodiment of the present invention, it is apparent that numerous alterations, omissions, and additions may be made without departing from the spirit thereof. Accordingly, the invention should be limited only as required by the scope of the following claims.

I claim:

1. An adjustable lap for lapping a surface comprising:
   a. a support member having front and back faces;
   b. a plurality of holes extending through said support member from said front face to said back face, each of said holes having a minimum cross-sectional area;
   c. a plurality of rods positioned within said holes with a positive clearance fit, each one of said rods being positioned within a different one of said holes and including a first portion located within its respective hole and a second portion extending outwardly of its respective hole a distance beyond said front face, said first and second portions of each of said rods having a maximum cross-sectional area which is less than the minimum cross-sectional area of the hole within which the first portion is positioned;
   d. means located at the end of the extended second portions of each of said rods for refining said surface; and
   e. means connecting said rods to said support member for maintaining the extended second portion of each of said rods at said distance outwardly beyond said front face.

2. An adjustable lap as recited in claim 1 wherein said holes are arranged in said support member in a predetermined array.

3. An adjustable lap as recited in claim 1 wherein said refining means comprises an abrasive means fastened to the end of said extended second portions of each of said rods.

4. An adjustable lap as recited in claim 1 wherein said refining means comprises means fastened to the end of the extended second portions of each of said rods for rubbing a loose abrasive material over said surface.

5. An adjustable lap as recited in claim 1 wherein said connecting means comprises an adhesive applied between said front face of said plate and said rods for bonding said rods to said plate.

6. An adjustable lap as recited in claim 5 wherein said rods are threaded around at least a portion thereof for increasing the strength of the bond between said adhesive and said rods.

7. An adjustable lap as recited in claim 1 wherein said rods also include a third portion extending outwardly beyond the back face of said support member.

8. An adjustable lap as recited in claim 7 wherein an adhesive is also provided between said back face of said plate and said rods for additionally bonding said rods to said support member.

9. An adjustable lap for lapping a surface comprising:
   a. a support member, said support member having a plurality of holes extending therethrough, said holes being substantially circular in cross-section and of substantially uniform diameter;
   b. a plurality of rods positioned in said holes, said rods being substantially circular in cross-section and having a substantially uniform diameter slightly less than that of the holes in which they are positioned, each of said rods having a portion thereof extending a distance outwardly of said holes;
   c. means positioned at the end of the extended portion of each of said rods for lapping said surface; and
   d. adhesive means for bonding said rods to said support member for maintaining the extended portions of said rods at said distance outwardly of said holes.

10. An adjustable lap as recited in claim 9 wherein at least some of said rods extend outwardly beyond said holes for different distances than others of said rods.

11. An adjustable lap as recited in claim 1 wherein the cross-sectional area of each of said holes is substantially uniform throughout its length from the front face to the back face.

12. An adjustable lap as recited in claim 11 wherein the cross-sectional area of each of said rods is substantially uniform throughout its length.

13. Apparatus for constructing a lap comprising:
   a. a support member having front and back surfaces and a plurality of holes extending therethrough from said front to said back surface;
   b. a plurality of rods having front and back ends movably positioned within said holes;
   c. a master surface having a predetermined surface contour;
   d. means for supporting said support member above said master surface and spaced therefrom;
   e. means for applying force against the back ends of each of said rods for pressing the front ends thereof against said master surface for causing said front ends to conform to the contour of said master surface; and
   f. means for securing said rods to said support member in said conformed position.

14. Apparatus as recited in claim 13 and including refining means mounted to the front ends of each of said rods.

15. Apparatus as set forth in claim 13 wherein said means for supporting said support member comprises a plurality of spacer elements removably mounted to said support member.

16. A method for constructing a lap for use in lapping a work surface comprising:
   a. providing a support member having a plurality of holes extending therethrough;
   b. movably positioning a plurality of rods within said holes;
   c. supporting said support member with said movably positioned rods above a master surface;
   d. applying force to one end of each of said rods for pressing the opposite ends of each of said rods against said master surface for causing the opposite ends of said rods to conform to the shape of said master surface; and
   e. securing said rods to said support member in the conformed position.

17. A method as recited in claim 16 wherein said securing step is performed while maintaining the application of force to said rods.

18. A method as recited in claim 17 wherein said rods are secured to said member with a heat softenable adhesive and wherein said force applying step and said securing step are performed within a heated chamber.

* * * * *

UNITED STATES PATENT OFFICE
CERTIFICATE OF CORRECTION

Patent No. 3,662,499     Dated May 16, 1972

Inventor(s) Ronald Aspden

It is certified that error appears in the above-identified patent and that said Letters Patent are hereby corrected as shown below:

On the cover page, at the top of the drawing figure thereon, the notation "(PRIOR ART)" should be deleted.

Signed and sealed this 5th day of December 1972.

(SEAL)
Attest:

EDWARD M. FLETCHER, JR.
Attesting Officer

ROBERT GOTTSCHALK
Commissioner of Patents